United States Patent [19]

Carlson et al.

[11] 4,056,512

[45] Nov. 1, 1977

[54] COMPOSITION COMPRISING PHENOLIC RESINS AND CURING AMOUNTS TRIAZA PHOSPHAADAMANTANE COMPOUNDS

[75] Inventors: Richard D. Carlson, Grand Island; Akio Takahashi, Amherst, both of N.Y.

[73] Assignee: Hooker Chemicals & Plastics Corporation, Niagara Falls, N.Y.

[21] Appl. No.: 661,894

[22] Filed: Feb. 27, 1976

[51] Int. Cl.$^2$ ............................................. C08G 8/28
[52] U.S. Cl. .............................. 260/59 R; 260/19 N; 260/17.2; 260/50

[58] Field of Search ........................................ 260/59 R

[56] References Cited

U.S. PATENT DOCUMENTS 3,899,619  8/1975  Daigle et al. ..................... 427/396

Primary Examiner—Howard E. Schain
Attorney, Agent, or Firm—P. F. Casella; J. F. Mudd; W. G. Gosz

[57] ABSTRACT

Phosphaadamantane compounds are provided to control the curing behavior of phenolic-type novolac resins under storage conditions at moderate temperatures.

11 Claims, No Drawings

COMPOSITION COMPRISING PHENOLIC RESINS AND CURING AMOUNTS TRIAZA PHOSPHAADAMANTANE COMPOUNDS

BACKGROUND OF THE INVENTION

Cured phenolic resins are generally prepared by compounding formaldehyde, or a substance capable of releasing formaldehyde such as hexamethylene-tetramine, with a fusible condensation product of phenol and formaldehyde, and curing the mixture. This is known as the two-stage process and the fusible condensation product is known as a novolak. Novolaks are intentionally prepared with a deficiency of formaldehyde, and will not cure by themselves. In order to cure the novolak, some form of aldehyde or aldehyde donor must be added to bring the ratio of aldehyde to phenol to the proper level for curing. Commercially, hexamethylenetetramine is commonly used and is blended in finely divided form with the pulverized resin. Under the influence of heat, the hexamethylenetetramine breaks down into formaldehyde and ammonia, and the formaldehyde reacts with the novolak under alkaline conditions. The end result is the formation of a network by the cross-linking of the many linear and branched polymer chains formed during previous reactions.

In the production of molded articles, the phenolic molding compound is conventionally mixed in a barrel prior to injection molding. The barrel is maintained at a temperature that is somewhat less than the molding temperature. The barrel temperature should be high enough so that the resin is sufficiently fluid to be injection molded, and yet low enough so that the resin will not prematurely cure or harden. A barrel temperature that is too low will cause the resin to become too viscous, and ultimately granular or powdery. If the barrel temperature is maintained at a level that is too high, the resin will harden prior to injection molding.

As is known to those skilled in the art, hexamethylene-tetramine may decompose and form formaldehyde and ammonia at temperatures of as low as 90° C when contacted with a phenolic resin, causing the resin to cross-link prematurely. Since the rate of cross-linking increases with increasing temperature, the barrel life at the barrel temperature (usually about 125° C) is shorter than would be commercially desirable, after which the phenolic molding compound loses fluidity and cannot be injected. Consequently, it would be advantageous to increase the time available for the molding process by extending the barrel life of the resin.

Accordingly, it is an object of this invention to provide a cross-linking or curing agent for phenolic molding compounds which is thermally stable below the molding temperature, but which will be sufficiently reactive at the molding temperature so that the rate of curing of the resin, or the molding cycle, will not be significantly affected. It is a further object to provide a curing agent which will extend the barrel life of phenolic molding compounds and increase the efficiency of the molding operation.

SUMMARY OF THE INVENTION

It has now been found that triaza phosphaadamantane compounds may be used as cross-linking or curing agents for phenolic molding compounds and will effectively extend the barrel or shelf life of the resin prior to the injection molding process. The novel cross-linking agents found particularly effective include the following:

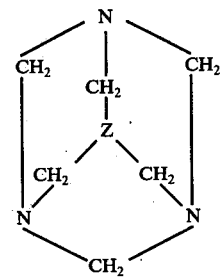

wherein Z is selected from

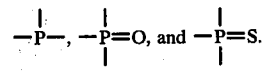

DESCRIPTION OF THE PREFERRED EMBODIMENTS

In accordance with the present invention, novel cross-linking or curing agents for phenolic molding compounds comprising phosphorus-containing adamantane compounds are useful in improving the efficiency of the molding operation by extending the barrel life of the resin.

The phenolic molding compounds used in practicing this invention can be prepared from starting materials comprising fusible, organic solvent-soluble condensation products of a phenol and an aldehyde or a ketone. These materials are well known to the art and can be prepared by well known methods. The phenol-aldehyde or phenol-ketone condensate should be soluble in organic solvents such as acetone and it should not be advanced to the insoluble "C" stage or resite stage. When the phenol is phenol itself and the aldehyde is formaldehyde, one type of condensation which is highly satisfactory contains condensation units which can be exemplified by the following formula:

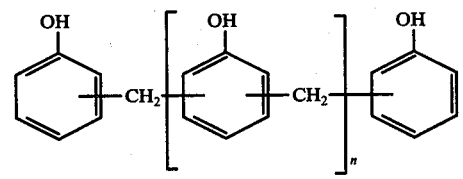

wherein $n$ has an average value of from 1 to 10, and often higher, provided the resin is fusible and acetone or organic solvent-soluble. The phenol-aldehyde condensate is a novolac which contains more than one mole of phenol per mole of aldehyde or ketone.

Examples of phenols which can be used in preparing phenol-aldehyde condensates for use in practicing the invention include phenol itself or substituted phenols, wherein at least about half the substituted phenols have at least two of the ortho and para positions of the phenol nucleus available for condensation reaction (unsubstituted). Such phenols have the following general formula:

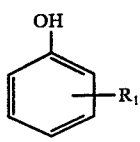

where R₁ can be hydrogen, fluorine, chlorine, bromine or a suitable substituent selected from the following:
a. Alkyl and alkenyl groups of 1 to 18 carbon atoms in any of their isomeric forms and substituted on the phenolic nucleus in the ortho, meta or para positions;
b. Alicyclic groups of 5 to 18 carbon atoms such as cyclohexyl, cyclopentyl, methyl, cyclohexyl, butyl cyclohexyl, and the like;
c. Aromatic or aralkyl groups of 6 to 18 carbon atoms such as phenyl, alpha-methyl benzyl, benzyl, cumyl and the like;
d. Alkyl, alkenyl, alicyclic, aryl and aralkyl ketones wherein the hydrocarbon is defined hereinbefore;
e. Alkyl, alkenyl, alicyclic, aryl and aralkyl carboxylic groups wherein the hydrocarbon is defined hereinbefore, and mixtures thereof.

As indicated, the hydrocarbon radicals preferably have 1 to 18 carbon atoms.

Suitable substituted phenols include the following: para - tertiary - butylphenol, para - chlorophenol, para - tertiary - hyxylphenol, para - isooctylphenol, para - phenyl - phenol, para - benxylphenol, para - cyclohexyl-phenol, para - octadecylphenol, para - nonylphenol, para - beta - naphthylphenol, para - alpha - naphthyl-phenol, cetyl - phenol, para - beta-naphthylphenol, para - alpha - naphthylphenol, cetyl-phenol, para - cumyl-phenol, para - hydroxyacetophenone, para - hydroxybenzophenone, a phenol alkylated with limonene, a phenol alkylated with oleic acid, as well as the corresponding ortho and meta derivatives such as meta - butylphenol and ortho-butylphenol, as well as mixtures thereof.

Aldehydes or ketones or mixtures thereof capable of reacting with a phenol are satisfactory, provided the aldehydes or ketones do not contain a functional group or structure which is detrimental to the condensation reaction. The preferred aldehyde is formaldehyde, which can be in aqueous solution or in any of its low polymeric forms such as paraform or trioxane. The aldehydes preferably contain 1 to 8 carbon atoms. Other examples include acetaldehyde, propionaldehyde, butyraldehyde, benzoldehyde, furfural, 2-ethylhexanol, ethylhexanol, ethylbutyraldehyde, heptaldehyde, pentaerythrose, glyoxal, chloral, mesityl oxide, and the like. The ketones have the formula:

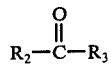

wherein R₂ and R₃ can be hydrogen or organic radicals. Examples of ketones are acetone, methyl ethyl ketone, diethyl ketone, methyl benzyl ketone, methyl cyclohexyl ketone, diallyl ketone, dichloromethyl ketone, as well as mixtures thereof. R₂ and R₃ preferably have 1 to 7 carbon atoms.

The ratio of aldehyde or ketone to the phenol can be varied to prepare condensates of various molecular weights and viscosity of the final condensation product can be regulated by the molecular weight of the phenol-aldehyde or phenol-ketone condensate. Preferably, the amount of aldehyde or ketone varies from 0.5 to 0.9 mole per mole of the phenol when a mono-or difunctional phenol is used. In instances where a trifunctional phenol is used, the preferred upper ratio of aldehyde or ketone is about 0.85 mole per mole of phenol.

The novolak is compounded with the cross-linking agent and optionally a small amount of a curing accelerator such as lime. Additional adjuvants, such as zinc stearate, can be added to the compound in order to improve the molding properties, aid the flow or plasticize. Wood flour is frequently added as a filler in commercial application, and a curing accelerator at the molding temperature, such as an ortho phenolic resin, can also be blended in.

The novel cross-linking agents of this invention are triaza phosphaadamantane compounds of the following general formula:

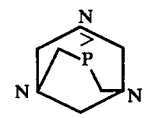

The preferred triaza phosphaadamantanes are more particularly described as follows:

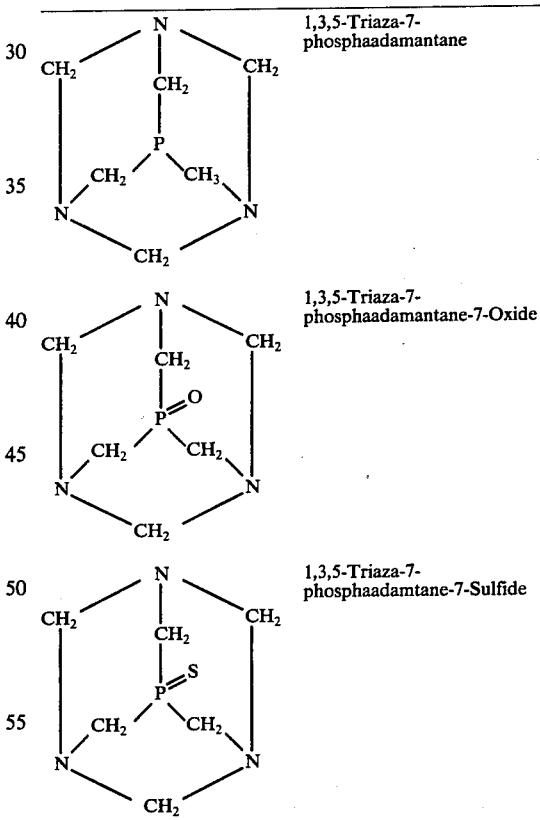

The resin, fillers, and other ingredients can be thoroughly blended by ball-milling, and plasticized by roll-milling, using conventional techniques. After it is fused, the molding composition can be cured using a Brabender Plasticorder (ASTM designation D-1898), and the time interval to the onset of cure of the resin may be measured to determine the barrel life and the molding cycle.

Prolonging the barrel life of the resin may result in a somewhat longer molding cycle than in a conventionally cured phenolic resin. In such a case, shortening the molding cycle may be effected by the adjustment of the operating variables, such as by increasing the molding temperature, and by increasing the amount of ortho phenolic resin in the molding composition.

The novel curing agents of this invention may be used individually, or in combination with conventional formaldehyde releasing curing agents, such as hexamethylenetetramine. The triaza phosphaadamantanes of the invention comprises at least about 50 weight percent of the total curing agent. The most preferred mixture comprises a hexamethylenetetramine/triaza phosphaadamantane weight ratio of about 1:3. The amount of curing agent required will depend on the cross-linking characteristics of the particular resin system. For instance, a novolak resin will typically require from about 10 to about 20 parts by weight of curing agent per 100 parts by weight of novolak resin.

The following examples further illustrate the various aspects of the invention but are not intended to limit it. For instance, in accordance with known practice, the molding composition may also include additional appropriate ingredients including fillers, pigments, curing agents, lubricants, fire retardants, mold release agents, reinforcing agents, and the like. Where not otherwise specified in this specification and claims, temperatures are given in degrees centigrade, and all parts and percentages are by weight.

A. Preparation of Novel Cross-Linking Agents

EXAMPLE 1

Preparation of 1,3,5-Triaza-7-Phosphaadamantane 4.5 grams of a 70% solution of tris (hydroxymethyl) phosphine and 8.0 grams of a 37% formaldehyde solution are added to 70 milliliters of water in a beaker and cooled with an ice bath, followed by the addition of 3.5 grams of hexamethylenetetramine. The beaker is allowed to stand in a hood for approximately 3 days until the solution forms a viscous liquid with a white solid present. Following recrystallization from 70 milliliters of ethanol, a white precipitate is collected with vacuum filtration to yield 1.5 grams of product consisting of 10% hexamethylenetetramine and 90% 1,3,5-triaza-7-phosphaadamantane.

EXAMPLE 2

Preparation of 1,3,5-Triaza-7-Phosphaadamantane-7-Oxide 201 grams of a 91% solution of 1,3,5-triaza-7-phosphaadamantane in 7 liters of methanol is added into a 22 liter three-neck flask equipped with a thermometer, overhead stirring, and an addition funnel. The flask is cooled with an ice bath and 196 grams of a 30% solution of hydrogen peroxide is added in 7.5 liters of ethanol over a period of 1 hour and 5 minutes. The temperature of the flask is maintained below about 18° C. After overnight stirring, the flask is cooled with an ice bath and a white solid precipitate is filtered with a vacuum to yield 146 grams of a product consisting of 84% 1,3,5-triaza-7-phosphaadamantane-7-oxide, 12% 1,3,5-triaza-7-phosphaadamantane, and 4% hexamethylenetetramine.

EXAMPLE 3

Preparation of 1,3,5-Triaza-7-Phosphaadamantane-7-Sulfide

A mixture of 131 grams of 1,3,5-triaza-7-phosphaadamantane and 111 grams of hexamethylenetetramine is added to a soxhlet thimble and placed into a soxhlet apparatus. A 3-liter flask containing 1500 milliliters of benzene and 29.3 grams of sulfur is attached to the apparatus and the system is refluxed for 21 hours. The sulfur is precipitated and the flask is cooled with an ice bath. A white precipitate is collected with a vacuum to yield 121 grams of 89% purity 1,3,5-triaza-7-phosphaadamantane-7-sulfide.

B. Preparation of Phenolic Molding Compounds

EXAMPLE 4

Control 100 parts of a phenol-formaldehyde novolak resin, 18 parts of hexamethylenetetramine, 2 parts of lime, 1 part of stearic acid, 1 part of zinc stearate, and 2 parts of monoglycidol stearate is ball-milled for 30 minutes. To this mixture is added 28.5 parts of ortho phenolic resin and 44.6 parts of wood flour. The resulting mixture is then ball-milled for 1 hour and then roll-milled three times at 80° C (front roll) and 100° C (back roll).

The novolak resin has a shrink melting point of 54° – 64° C, a clear melting point of 64° – 74° C, and an inclined plate flow (using a 0.3 gram Pill) of 230 m.m. – 280 m.m. Melting points are determined using standard capillary melting point test.

EXAMPLE 5

The procedure of Example 4 is repeated substituting 1,3,5 - Triaza - 7 - phospaadamantane for hexamethylenetetramine.

EXAMPLE 6

The procedure of Example 4 is repeated substituting 1,3,5 - Triaza - 7 - phospaadamantane - 7 - Oxide for hexamethylenetetramine.

EXAMPLE 7

The procedure of Example 4 is repeated substituting 1,3,5 - Triaza - 7 - phospaadamantane - 7 - Sulfide for hexamethylene tetramine.

The phenolic molding compounds of Examples 4, 5, 6 and 7 are then cured using a Brabender Plasticorder (ASTM designation D-1898), and the time to the onset of cure, as measured by the elapsed time between the fusion point and the curing point, is recorded. The results are set forth in Table 1 below, where the time indicated is the time to onset of cure.

TABLE 1

|  | Molding Compound of Example 4 (control) | Molding Compound of Example 5 | Molding Compound of Example 6 | Molding Compound of Example 7 |
| --- | --- | --- | --- | --- |
| Barrel Life at 125° C | 176 sec. | 498 sec. | 392 sec. | >15 min. |
| Molding Cycle at 170° C | 70 sec. | 91 sec. | 91 sec. | 175 sec. |

For purposes of comparison, the molding compounds of the present invention (i.e. Examples 5–7) exhibit barrel lives that are unexpectedly greater than the barrel life of the control compound (i.e. Example 4) incorporating hexamethylenetetramine as a curing agent.

EXAMPLE 8-12

The peak exotherm time at the barrel temperature (125° C) and the molding temperature (165° C) was determined for various blends of 1,3,5-triaza-7-phosphaadamantane and hexamethylenetetramine using a Differential Scanning Calorimeter. The best combination of results were obtained in Example 11 with a blend of 75 parts by weight of 1,3,5-triaza-7-phosphaadamantane and 25 parts by weight of hexamethylenetetramine, as set forth in Table 2 below.

The foregoing embodiments are intended to illustrate the invention but not to limit it. Various modifications can be made in the invention without departing from the spirit and scope thereof.

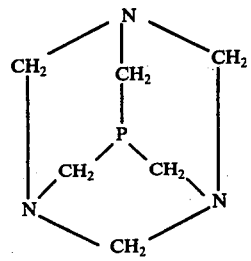

TABLE 2

| Example No. | Peak Exotherm Time (Seconds) | | | | |
|---|---|---|---|---|---|
| | 8 | 9 | 10 | 11 | 12 |
| Isothermal Temperature °C | 100% Hexamethylenetetramine | 75 parts Hexamethylenetetramine 25 parts triaza-phosphaadamantane | 50 parts Hexamethylenetetramine 50 parts triaza-phosphaadamantane | 25 parts Hexamethylenetetramine 75 parts triaza-phosphaadamantane | 100% triaza-phosphaadamantane |
| 125 | 233 | 246 | 282 | 354 | 480 |
| 165 | 18 | 25 | 32 | 34 | 60 |

We claim:

1. A curable phenolic molding compound comprising an uncured phenolictype novolak resin and curing amount of a triaza phosphaadamantane compound having the formula:

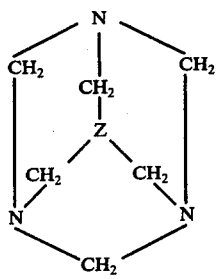

wherein Z is selected from

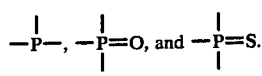

2. The molding compound of claim 1 wherein said triaza phosphaadamantane compound has the formula:

3. The molding compound of claim 1 wherein said uncured resin is a phenolaldehyde resin.

4. The molding compound of claim 3 wherein said phenol-aldehyde resin is a phenol-formaldehyde resin.

5. The molding compound of claim 1 wherein said cross-linking agent comprises a mixture of a formaldehyde releasing substance and a triaza phosphaadamantane compound of the formula:

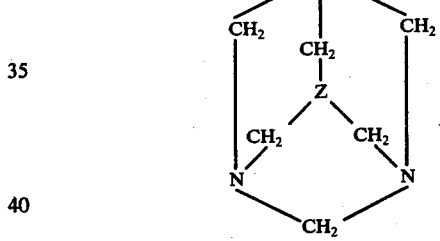

wherein Z is selected from

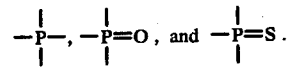

6. The molding compound of claim 5 wherein said formaldehyde releasing substance is hexamethylenetetramine.

7. The molding compound of claim 6 wherein the mixture of hexamethylenetetramine and triaza phosphaadamantane comprises a weight ratio of hexamethylenetetramine to triaza phosphaadamantane of about 1:3.

8. The molding compound of claim 1 wherein said cross-linking agent is present in the amount of from about 10 to about 20 parts by weight per 100 parts by weight of novolak resin.

9. The molding compound of claim 1 which additionally comprises a filler, a curing accelerator, a mold release agent, and reinforcing agents.

10. The molding compound of claim 1 when cured to an infusible state.

11. The molding compound of claim 8 when cured to an infusible state.

* * * * *